(12) United States Patent  
Cho et al.

(10) Patent No.: US 8,832,342 B2  
(45) Date of Patent: Sep. 9, 2014

(54) TRAFFIC COMMUNICATION MODULE AND METHOD OF FORMING THE SAME

(75) Inventors: Juik Cho, Seoul (KR); Yunyeop Lee, Seoul (KR)

(73) Assignee: LG CNS Co., Ltd., Seoul (KR)

( * ) Notice: Subject to any disclaimer, the term of this patent is extended or adjusted under 35 U.S.C. 154(b) by 353 days.

(21) Appl. No.: 13/283,881

(22) Filed: Oct. 28, 2011

(65) Prior Publication Data

US 2013/0111088 A1    May 2, 2013

(51) Int. Cl.  
*G06F 13/00*    (2006.01)

(52) U.S. Cl.  
CPC .................................. *G06F 13/00* (2013.01)  
USPC ........................... 710/110; 709/208; 709/230

(58) Field of Classification Search  
CPC ............... H04J 3/0652; H04L 12/1836; H04L 43/0811; H04L 69/169  
USPC ........................ 710/110, 305; 709/208, 230  
See application file for complete search history.

(56) References Cited

U.S. PATENT DOCUMENTS

| | | | |
|---|---|---|---|
| 6,195,688 B1 | 2/2001 | Caldwell et al. | |
| 6,317,803 B1 * | 11/2001 | Rasmussen et al. | 710/107 |
| 6,735,658 B1 * | 5/2004 | Thornton | 710/305 |
| 7,020,734 B2 * | 3/2006 | Mimatsu et al. | 710/311 |
| 7,356,018 B2 | 4/2008 | Seyama et al. | |
| 7,460,482 B2 | 12/2008 | Pike | |
| 7,529,241 B2 | 5/2009 | Milligan et al. | |
| 7,694,051 B2 | 4/2010 | Wei | |
| 7,802,033 B2 * | 9/2010 | Labute et al. | 710/54 |
| 7,957,402 B2 | 6/2011 | Konduru et al. | |
| 7,975,017 B1 * | 7/2011 | Kuzkin et al. | 709/208 |
| 8,566,897 B2 * | 10/2013 | Sequeira | 725/145 |
| 2001/0000194 A1 | 4/2001 | Sequiera | |
| 2006/0251046 A1 | 11/2006 | Fujiwara | |
| 2007/0156915 A1 * | 7/2007 | Neishi | 709/230 |
| 2009/0113232 A1 | 4/2009 | Park et al. | |
| 2009/0137318 A1 | 5/2009 | Russo et al. | |
| 2009/0177823 A1 * | 7/2009 | Chao | 710/110 |

OTHER PUBLICATIONS

Cypress Semiconductor. 12C Master/Multi-Master/Slave. Data Sheet. Nov. 30, 2010.*  
Hilscher. EtherCAT Master V3. Protocol API. V3.0.x.x. May 2013.*  
Kropp, Denis Oliver. Fusion. High level IPC. Jul. 2003.*  
Further Examination Report, dated Sep. 16, 2013, 3 pages.

* cited by examiner

*Primary Examiner* — Matthew D Spittle  
(74) *Attorney, Agent, or Firm* — Keohane & D'Alessandro PLLC

(57) ABSTRACT

Embodiments of the present invention provide a traffic communication module and method of forming the same. Specifically, among other things, embodiments of the present invention provide a traffic communication module (e.g., also referred to herein as a C2V module) having a set of components for facilitating/enabling communication between a master device (e.g., a console) and a set of slave devices (e.g., validators) across multiple communication protocols (e.g., rs485, rs232c, UDP, etc.). In a typical embodiment, the C2V module comprises: an application programming interface (API) component for configuring the traffic communication module; a communication component coupled to the API component for facilitating communications between the master and slave devices based upon a set of communication protocols; and a communication type component for generating a set of protocol-specific data packet files for the communications. The master devices and slave devices are also uniquely configured hereunder to provide for optimal operation.

19 Claims, 4 Drawing Sheets

| CATEGORY | EXPLANATION | EXAMPLE |
|---|---|---|
| INITIALIZATION | PRE-WORK FOR THE MODULE OPERATION | • ESTABLISH BAUD RATE<br>• RF PAD SCANNING<br>• SET THE TIMEOUT/RETRY NUMBER<br>• ESTABLISH PACKET SECRET CODE AND RECOVERY |
| PERIODIC JOB | PERIODIC CHECK<br>PERIODIC CONTROL FUNCTION | • HEART BEAT<br>• VISUAL FUNCTION<br>• OTHER INFORMATION (E.G. TRANSPORTATION OPERATION STATUS)<br>• JOB START/COMPLETE |
| COMMAND REQUEST/REPLY | REQUEST COMMAND AND REPLY | • REQUEST<br>• REPLY<br>• REQUEST(MULTI-TARGET) |
| FILE SEND/RECEIVE | SEND AND RECEIVE FILES | • SENDFILE/RECVFILE<br>• FILE |
| STATUS | CURRENT STATUS MONITORING | • PERIODIC JOB FAILURE COUNT<br>• TRANSMIT PACKET/RECEIVE PACKET |

FIG. 4

TRAFFIC COMMUNICATION MODULE AND METHOD OF FORMING THE SAME

FIELD OF THE INVENTION

In general, the present invention relates to a master-slave communication model. Specifically, the present invention relates to a traffic communication model for facilitating communication and method of forming the same.

BACKGROUND OF THE INVENTION

The master-slave model is a type of communication where one device or process (e.g., a master device) has unidirectional control over one or more other devices (e.g., a slave device). In some systems, a master is elected from a group of eligible devices, with the other devices acting in the role of slaves. There are multiple possible applications of the master-slave communication model. Described below are some examples of such applications:

Railway locomotives operating in multiple (e.g., to pull loads too heavy for a single locomotive) can be referred to as a master-slave configuration with the operation of all locomotives in the train slaved to the controls of the first locomotive.

In database replication, the master database is regarded as the authoritative source, and the slave databases are synchronized to it.

Peripherals connected to a bus in a computer system.

Duplication is often done with several cassette tape or compact disc recorders linked together. Operating the controls on the master triggers the same commands on the slaves, so that recording is done in parallel.

In parallel ATA hard drive arrangements, the terms master and slave are used but neither drive has control over the other. The terms also do not indicate precedence of one drive over the other in most situations. "Master" is merely another term for device 0 and "slave" indicates device 1.

As indicated, one application of the master-slave model is in public transportation and/or traffic management. Today, public transportation consists of a variety of modes including buses, trolleys, subways, trains, and ferries. Along with the various modes of transportation, there exists a variety of payment methods for the transportation fare. Accepted payment methods for public transportation may include tickets, tokens, cash, credit cards, debit cards, etc. Automated systems have attempted to make the payment process simpler and more efficient. Automated fare collection (AFC) system is the name given to automated transportation ticketing systems. Typically, AFC systems are connected to the information systems in vehicles, at stations or other transportation centers. Unfortunately, challenges may exist in providing optimal communication between master device and slave devices in a public transportation environment.

U.S. Pat. No. 7,957,402 discloses bridging communications between user datagram protocol and transmission control protocol.

U.S. Pat. No. 7,694,051 discloses detecting master-slave response time-out under continuous packet format communications protocol.

U.S. Pat. No. 7,529,241 discloses a network bridge for user datagram protocol multicast traffic.

U.S. Pat. No. 7,460,482 discloses a master-slave communications system for a communication switch.

U.S. Pat. No. 7,356,018 discloses a communication system including a master station communication device along with multiple slave station communication devices.

U.S. Patent Application 20090113232 discloses an apparatus for managing a plurality of wireless sensor networks.

U.S. Patent Application 20060251046 discloses a master-slave synchronization communication system.

SUMMARY OF THE INVENTION

In general, embodiments of the present invention provide a traffic communication module and method of forming the same. Specifically, among other things, embodiments of the present invention provide a traffic communication module (e.g., also referred to herein as a C2V module) having a set of components for facilitating/enabling communication between a master device (e.g., a console) and a set (at least one) of slave devices (e.g., validators) across multiple communication protocols (e.g., rs-485, rs-232c, UDP, etc.). In a typical embodiment, the C2V module comprises: an application programming interface (API) component for configuring the traffic communication module; a communication component coupled to the API component for facilitating communications between the master and slave devices based upon a set of communication protocols; and a communication type component for generating a set of protocol-specific data packets for the communications. The master devices and slave devices are also uniquely configured hereunder to provide for optimal operation.

A first aspect of the present invention provides a traffic communication module for master and slave devices, comprising: an application programming interface (API) component for configuring the traffic communication module; a communication component coupled to the API component for facilitating communications between the master and slave devices based upon a set of communication protocols; and a communication type component coupled to the API component for generating a set of protocol-specific data packet files for the communications.

A second aspect of the present invention provides a traffic communication system, comprising: a console comprising a master pulse module, a master channel module, and a master dispatcher thread; a set of validators in communication with the console, each of the set of validators comprising a slave channel module and a slave dispatcher thread; and wherein the master channel module communicates with the slave channel module in each of the set of validators.

A third aspect of the present invention provides a method for forming traffic communication module for a master device and a set of slave devices, comprising: providing an application programming an interface (API) component for configuring the traffic communication module; coupling a communication component to the API component for facilitating communications between the master device and the set of slave devices based upon a set of communication protocols; and coupling a communication type component to the API for generating a set of protocol-specific data packet files for the communications.

BRIEF DESCRIPTION OF THE DRAWINGS

These and other features of this invention will be more readily understood from the following detailed description of the various aspects of the invention taken in conjunction with the accompanying drawings in which:

FIG. 4 shows a table of API types and functions according to an embodiment of the present invention The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
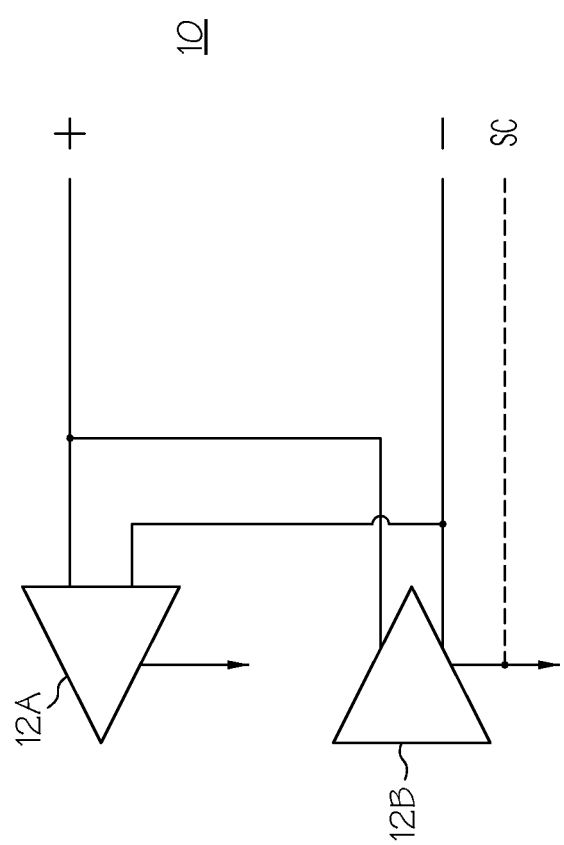
FIG. 1 depicts a three wire connection provided under the RS-485 communication protocol according to an embodiment of the present invention.

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "coupled" is intended to mean any connection and/or communication between two objects. Such connection can be physical (e.g., wired) or logical (e.g., wireless). The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide a traffic communication module and method of forming the same. Specifically, among other things, embodiments of the present invention provide a traffic communication module (e.g., also referred to herein as a C2V module) having a set of components for facilitating/enabling communication between a master device (e.g., a console) and a set of slave devices (e.g., validators) across multiple communication protocols (e.g., rs-485, rs-232c, UDP, etc.). In a typical embodiment, the C2V module comprises: an application programming interface (API) component for configuring the traffic communication module; a communication component coupled to the API component for facilitating communications between the master and slave devices based upon a set of communication protocols; and a communication type component for generating a set of protocol-specific data packets for the communications. The master devices and slave devices are also uniquely configured hereunder to provide for optimal operation.

Exemplary Protocols

This section will discuss a set of illustrative protocols accommodated in accordance with the embodiments of the present invention. It is understood in advance that this set is non-exhaustive. Rather, the teachings recited herein can accommodate other protocols. Those described herein as described for illustrative purposes only.

A. RS-232C

RS-232C is a standard that describes the physical interface and protocol for relatively low-speed serial data communication between computers and related devices. It was defined by an industry trade group, the Electronic Industries Association (EIA), originally for teletypewriter devices.

RS-232C is the interface that your computer uses to talk to and exchange data with your modem and other serial devices. Somewhere in your PC, typically on a Universal Asynchronous Receiver/Transmitter (UART) chip on your motherboard, the data from your computer is transmitted to an internal or external modem (or other serial device) from its Data Terminal Equipment (DTE) interface. Since data in your computer flows along parallel circuits and serial devices can handle only one bit at a time, the UART chip converts the groups of bits in parallel to a serial stream of bits. As your PC's DTE agent, it also communicates with the modem or other serial device, which, in accordance with the RS-232C standard, has a complementary interface called the Data Communications Equipment (DCE) interface.

In RS-232, user data is sent as a time series of bits. Both synchronous and asynchronous transmissions are supported by the standard. In addition to the data circuits, the standard defines a number of control circuits used to manage the connection between the DTE and DCE. Each data or control circuit only operates in one direction, that is signaling from a DTE to the attached DCE or the reverse. Since transmit data and receive data are separate circuits, the interface can operate in a full duplex manner, supporting concurrent data flow in both directions. The standard does not define character framing within the data stream, or character encoding.

The RS-232 standard defines the voltage levels that correspond to logical one and logical zero levels for the data transmission and the control signal lines. Valid signals are plus or minus 3 to 15 volts; the ±3 V range near zero volts is not a valid RS-232 level. The standard specifies a maximum open-circuit voltage of 25 volts: signal levels of ±5 V, ±10 V, ±12 V, and ±15 V are all commonly seen depending on the power supplies available within a device. RS-232 drivers and receivers must be able to withstand indefinite short circuit to ground or to any voltage level up to ±25 volts. The slew rate, or how fast the signal changes between levels, is also controlled.

For data transmission lines (TxD, RxD and their secondary channel equivalents) logic one is defined as a negative voltage, the signal condition is called marking, and has functional significance. Logic zero is positive and the signal condition is termed spacing. Control signals are logically inverted with respect to what one sees on the data transmission lines. When one of these signals is active, the voltage on the line will be between +3 to +15 volts. The inactive state for these signals is the opposite voltage condition, between −3 and −15 volts. Examples of control lines include request to send (RTS), clear to send (CTS), data terminal ready (DTR), and data set ready (DSR).

Because the voltage levels are higher than logic levels typically used by integrated circuits, special intervening driver circuits are required to translate logic levels. These also protect the device's internal circuitry from short circuits or transients that may appear on the RS-232 interface, and provide sufficient current to comply with the slew rate requirements for data transmission.

Because both ends of the RS-232 circuit depend on the ground pin being zero volts, problems will occur when connecting machinery and computers where the voltage between the ground pin on one end, and the ground pin on the other is not zero. This may also cause a hazardous ground loop. Use of a common ground limits RS-232 to applications with relatively short cables. If the two devices are far enough apart or on separate power systems, the local ground connections at either end of the cable will have differing voltages; this difference will reduce the noise margin of the signals. Balanced, differential, serial connections such as USB, RS-422 and RS-485 can tolerate larger ground voltage differences because of the differential signaling.

Unused interface signals terminated to ground will have an undefined logic state. Where it is necessary to permanently set a control signal to a defined state, it must be connected to a voltage source that asserts the logic 1 or logic 0 level. Some devices provide test voltages on their interface connectors for this purpose.

RS-232 devices may be classified as Data Terminal Equipment (DTE) or Data Communication Equipment (DCE); this defines at each device which wires will be sending and receiving each signal. The standard recommended, but did not make mandatory, the D-subminiature 25 pin connector. In general and according to the standard, terminals and computers have male connectors with DTE pin functions, and modems have female connectors with DCE pin functions. Other devices may have any combination of connector gender and pin definitions. Many terminals were manufactured with female terminals but were sold with a cable with male connectors at each end. The terminal with its cable satisfied the recommendations in the standard. The presence of a 25 pin D-sub connector does not necessarily indicate an RS-232-C compliant interface. For example, on the original IBM PC, a male D-sub was an RS-232-C DTE port (with a non-standard current loop interface on reserved pins), but the female D-sub connector was used for a parallel Centronics printer port. Some personal computers put non-standard voltages or signals on some pins of their serial ports.

The standard specifies 20 different signal connections. Since most devices use only a few signals, smaller connectors can often be used.

B. RS-485

RS-485 is a standard defining the electrical characteristics of drivers and receivers for use in balanced digital multipoint systems. The standard is published by the ANSI Telecommunications Industry Association/Electronic Industries Alliance (TIA/EIA). Digital communications networks implementing the EIA-485 standard can be used effectively over long distances and in electrically noisy environments. Multiple receivers may be connected to such a network in a linear, multi-drop configuration. These characteristics make such networks useful in industrial environments and similar applications.

EIA-485 only specifies electrical characteristics of the driver and the receiver. It does not specify or recommend any communications protocol. EIA-485 enables the configuration of inexpensive local networks and multidrop communications links. It offers data transmission speeds of 35 Mbit/s up to 10 m and 100 kbit/s at 1200 m. Since it uses a differential balanced line over twisted pair (like EIA-422), it can span relatively large distances (up to 4,000 feet (1,200 m)). A rule of thumb is that the speed in bit/s multiplied by the length in meters should not exceed $10^8$. Thus, a 50 meter cable should not signal faster than 2 Mbit/s.

In contrast to EIA-422, which has a single driver circuit which cannot be switched off, EIA-485 drivers need to be put in transmit mode explicitly by asserting a signal to the driver. This allows EIA-485 to implement linear topologies using only two wires. The equipment located along a set of EIA-485 wires are interchangeably called nodes, stations, and devices. The recommended arrangement of the wires is as a connected series of point-to-point (multi-dropped) nodes, or a line or bus, not a star, ring, or multiply connected network. Ideally, the two ends of the cable will have a termination resistor connected across the two wires. Without termination resistors, reflections of fast driver edges can cause multiple data edges that can cause data corruption. Termination resistors also reduce electrical noise sensitivity due to the lower impedance, and bias resistors (see below) are required. The value of each termination resistor should be equal to the cable impedance (typically, 120 ohms for twisted pairs).

Star and ring topologies are not typically utilized due to signal reflections or excessively low or high termination impedance. But if a star configuration is unavoidable, such as when controlling multiple pan tilt zoom cameras from a central video surveillance hub, special EIA-485 star/hub repeaters are available which bi-directionally listen for data on each span and then retransmit the data onto all other spans.

Somewhere along the set of wires, pull up or pull down resistors are established to Fail-safe bias each data line/wire when the lines are not being driven by any device. This way, the lines will be biased to known voltages, and nodes will not interpret the noise from un-driven lines as actual data. Without biasing resistors, the data lines float in such a way that electrical noise sensitivity is greatest when all device stations are silent or unpowered.

Often in a master-slave arrangement when one device dubbed "the master" initiates all communication activity, the master device itself provides the bias and not the slave devices. In this configuration, the master device is typically centrally located along the set of EIA-485 wires, so it would be two slave devices located at the physical end of the wires that would provide the termination. The master device itself would provide termination if it were located at a physical end of the wires, but that is often a bad design as the master would be better located at a halfway point between the slave devices. Note that it is not a good idea to apply the bias at multiple node locations because, by doing so, the effective bias resistance is lowered, which could possibly cause a violation of the EIA-485 specification and cause communications to malfunction. By keeping the biasing with the master, slave device design is simplified, and this situation is avoided.

Referring now to FIG. 1, a three-wire connection 10 in accordance with RS-485 is depicted. As depicted, connection 10 comprises an interconnected set of transceivers 12A-B. Even though the data is transmitted over a two-wire twisted pair bus, all EIA-485 transceivers interpret the voltage levels of the differential signals with respect to a third common voltage. Without this common reference, a set of transceivers may interpret the differential signals incorrectly. In a typical setup, this third voltage is implied in the power supply common/ground connection. However, fundamentally speaking, there is nothing requiring this common voltage to be the same as the power supply. In fact, certain MS/TP (Master Slave/Token Passing) wiring requires full isolation between the various EIA-485 devices and has to utilize the third wire for the common connection.

EIA-485, like EIA-422 can be made full-duplex by using four wires. Since EIA-485 is a multi-point specification, however, this is not necessary in many cases. EIA-485 and EIA-422 can interoperate with certain restrictions. Converters between EIA-485 and other formats are available to allow a personal computer to communicate with remote devices. By using "Repeaters" and "Multi-Repeaters", very large RS-485 networks can be formed. The Application Guidelines for TINEIA-485-A has one diagram called "Star Configuration. Not recommended." Using an RS-485 "Multi-Repeater" can allow for "Star Configurations" with "Home Runs" (or multi-drop) connections similar to Ethernet Hub/Star implementations (with greater distances). Hub/Star systems (with "Multi-Repeaters") allow for very maintainable systems, without violating any of the RS-485 specifications. Repeaters can also be used to extend the distance or number of nodes on a network.

EIA-485 signals are used in a wide range of computer and automation systems. In a computer system, SCSI-2 and SCSI-3 may use this specification to implement the physical layer for data transmission between a controller and a disk drive. EIA-485 is used for low-speed data communications in commercial aircraft cabins vehicle bus. It requires minimal wiring, and can share the wiring among several seats, reducing the weight. EIA-485 is used as the physical layer underlying many standard and proprietary automation protocols used to implement Industrial Control Systems, including the most common versions of Modbus and Profibus. These are used in programmable logic controllers and on factory floors. Since it is differential, it resists electromagnetic interference from motors and welding equipment.

In theatre and performance venues, EIA-485 networks are used to control lighting and other systems using the DMX512 protocol. In surveillance, EIA-485 is used to control pan tilt zoom cameras. EIA-485 is also used in building automation, as the simple bus wiring and long cable length is ideal for joining remote devices. It may be used to control video surveillance systems or to interconnect security control panels and devices such as access control card readers. Although many applications use EIA-485 signal levels, the speed, format, and protocol of the data transmission is not specified by EIA-485. Interoperation even of similar devices from different manufacturers is not assured by compliance with the signal levels alone.

C. UDP

UDP (User Datagram Protocol) is a communications protocol that offers a limited amount of service when messages are exchanged between computers in a network that uses the Internet Protocol (IP). UDP is an alternative to the Transmission Control Protocol (TCP) and, together with IP, is sometimes referred to as UDP/IP. Like the TCP, UDP uses the Internet Protocol to communicate data to a destination. Unlike TCP, however, UDP does not provide the service of dividing a message into packets (datagrams) and reassembling it at the other end. Specifically, UDP does not provide sequencing of the packets that the data arrives in. This means that the application program that uses UDP must be able to make sure that the entire message has arrived and is in the right order. Network applications that want to save processing time because they have very small data units to exchange (and therefore very little message reassembling to do) may prefer UDP to TCP. The Trivial File Transfer Protocol (TFTP) uses UDP instead of TCP.

UDP provides two services not provided by the IP layer. It provides port numbers to help distinguish different user requests and, optionally, a checksum capability to verify that the data arrived intact. In the Open Systems Interconnection (OSI) communication model, UDP, like TCP, is in layer 4, the Transport Layer.

Illustrative Embodiments

Figure 2:
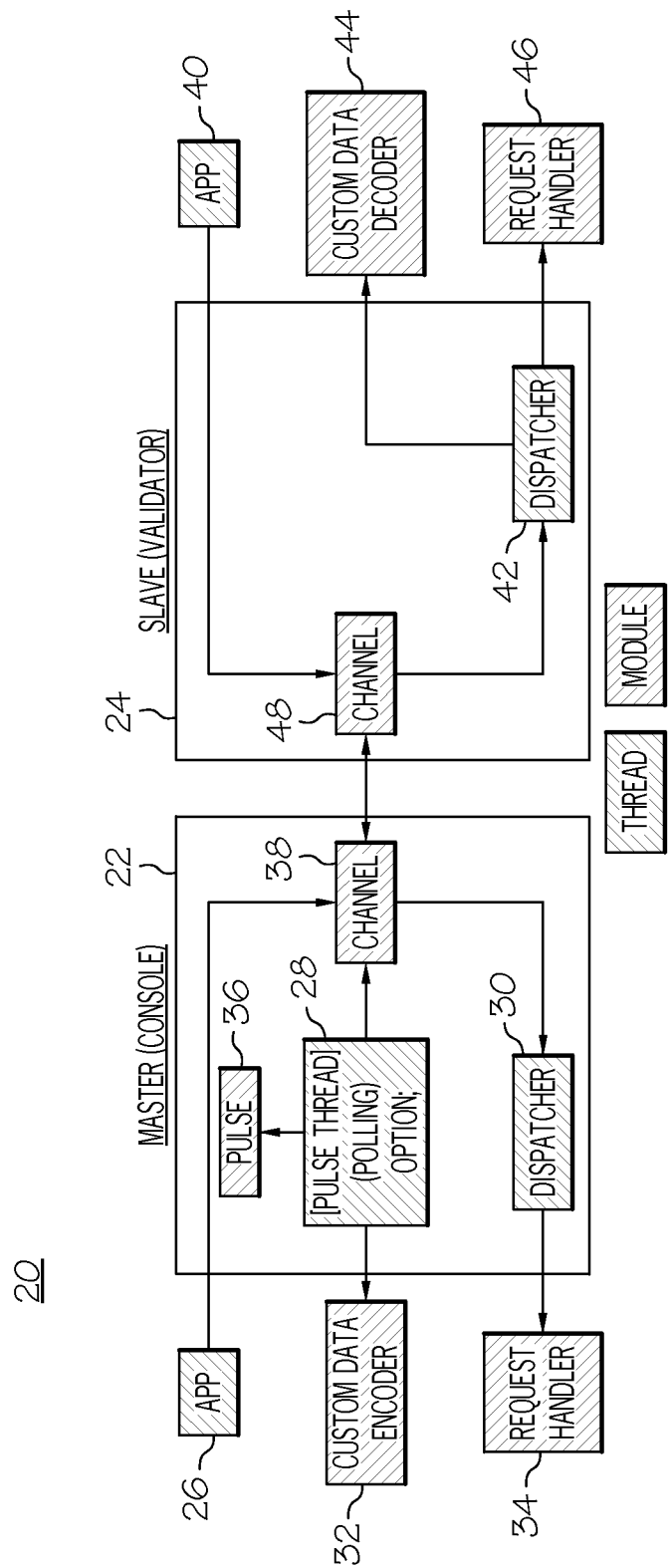
FIG. 2 depicts a master-slave device configuration according to an embodiment of the present invention.

Referring to FIG. 2 a structural diagram for a traffic communication module/C2V (hereinafter module 20) according to an embodiment of the present invention is shown. As indicated above (among other things), module 20 enables communication between devices or protocols such as rs485, rs232c, UDP, TCP/IP, etc. Along these lines, module 20 provides a generic communication device for master-slave systems such as the Automated Fare Collection (AFC) system, which is commercially available from LG CNS Co., Ltd. of Seoul, Republic of Korea.

As depicted, module 20 comprises a master device/console 22 (driver-operated), and a set (at least one) of slave device/validators 24 (e.g., passenger terminal). It is understood that although a single slave device 24 is depicted, the embodiments of the present invention can accommodate any quantity thereof. In a typical embodiment, master device 22: connects two or more slave devices 24; designates a target device and sends commands thereto; exchanges files with slave device(s) 24; determines how many slave devices 24 are connected and periodically checks the corresponding connection statuses; synchronizes master and slave devices; collects all static information; and selects communication protocols such as RS-485, RS-232C, UDP, etc., for communication. In addition, slave device(s) 24: communicate with master device 22; send files to master device 22 or other slave devices 24; confirm all static information (by command, number of packet, etc,); etc.

As depicted, master device 22 comprises a master application thread 26 for interacting with master applications (e.g., sending requests to other devices), an optional master pulse thread 28 (e.g., for polling slave device 24 and/or checking the statuses of connections), and a master dispatcher thread 30 for dispatching master requests and performing operations upon command from the slave device(s) 24. Master device 22 further comprises master custom data encoder module 32 for encoding and/or decoding data packets, a master request handler module 34 for handling requests exchanged (sent or received) with master device 24, a master pulse module 36 for polling slave devices 24, and a master channel module 38 for communicating with slave device(s) 24 (via slave channel module 48). As further shown, slave device 24 comprises a slave application thread 40 for interacting with slave applications and sending requests to other slave devices 24; a slave dispatcher thread 42 for dispatching slave requests and handling requests directly in order to reduce device workload, a slave custom data decoder module 44, a slave request handler module 46 for handling requests exchanged with slave device 24, and a slave channel module 48 for communicating with master device 22 (via master channel module 38). In general, the threads/modules shown in FIG. 2 facilitate/enable effective communication between master device 22 and slave device(s) 24. Among other things, module 20 provides data packet generation and communication, connectivity checking, polling and message callback, etc.

Figure 3:
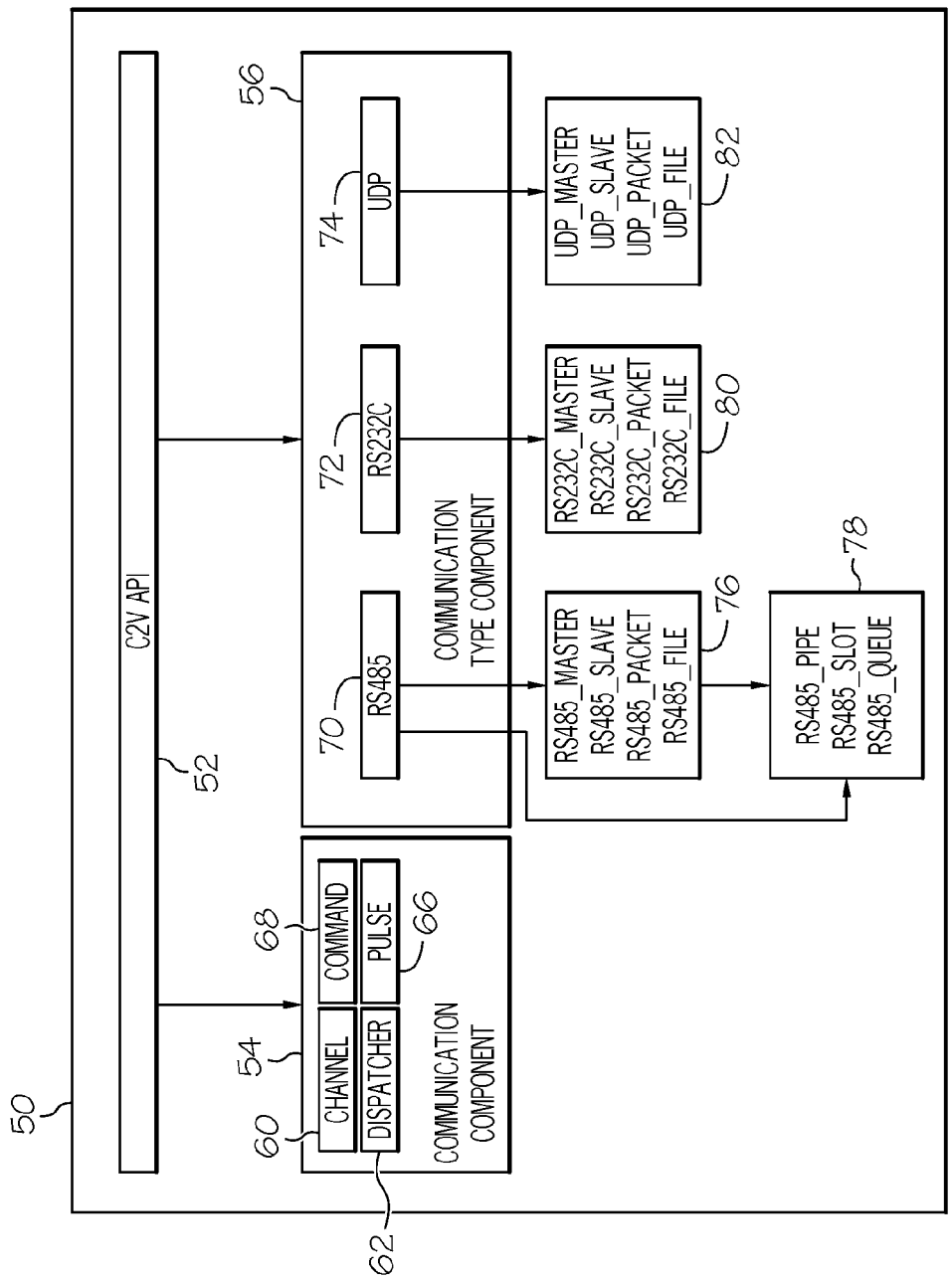
FIG. 3 depicts a diagram of a traffic communication module according to an embodiment of the present invention.

Referring now to FIG. 3, an internal module design 50 of module 20 is shown in greater detail. As depicted, design 50 comprises an API component 52 for configuring module 20 (or master device and slave devices thereof), a communication component 54 coupled to API component 52 for facilitating communications and commands exchanged between the master device and slave devices (e.g., defining C2V module 20); and a communication type component coupled to API component 52 for generating a set of protocol specific data packets for the communications between the master device and slave device(s).

As further depicted, communication component 54 generally comprises a channel module 60; a dispatcher thread 62; a pulse module/thread 66; and a command module 68. Still yet, communication type component 56 enables generation of unique master/slave packet files according a set of communication protocols. The generation of data packets and/or data packet files according to the exemplary communication protocols described herein is enabled by RS-485 module 70; RS-232C module 72; and UDP module 74. As shown, each module 70, 72, and 74 is capable of generating various "master," "slave," "packet," and "file" actions/commands 76, 80 and 82, respectively. As further shown, RS-485 protocol also includes "pipe," "slot," and "queue" functions 78.

Referring now to FIG. 4, a table 90 of illustrative API types and functions is shown according to an embodiment of the present invention. Table 90 can be configured for and referenced by API component 52 to define its functions. Examples of categories shown are initialization, periodic jobs, command request/reply; file send/receive, and status. Each category can have a corresponding explanation and examples of possible corresponding actions/functions. Table 90 can be configurable for changing functionality of API component 52, and expanded upon for improved reference.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A traffic communication module for a master device, comprising:
    an application programming interface (API) component for configuring the traffic communication module;
    a communication component coupled to the API component for facilitating communications between the master device and a set of slave devices based upon a set of communication protocols, wherein the master device comprises a master application thread and a master dispatcher thread; and
    a communication type component coupled to the API component for generating a set of protocol-specific data packet files for the communications.

2. The traffic communication module of claim 1, the set of communication protocols comprising at least one of the following: rs485, rs232c, or UDP.

3. The traffic communication module of claim 1, the communication component comprising:
    a channel module;
    a pulse module; and
    a dispatcher thread.

4. The traffic communication module of claim 3, the communication component further comprising: a command module.

5. The traffic communication module of claim 1, wherein the master device further comprises:
    a master pulse thread.

6. The traffic communication module of claim 5, the master device further comprising:
    a master pulse module;
    a master channel module;
    a master custom data encoder module; and
    a master request handler module.

7. A method for forming a traffic communication module for a master device and a set of slave devices, comprising:
    providing an application programming interface (API) component for configuring the traffic communication module;
    coupling a communication component to the API component for facilitating communications between the master device and the set of slave devices based upon a set of communication protocols; and
    coupling a communication type component to the API for generating a set of protocol-specific data packet files for the communications,
    wherein the set of communication protocols comprises at least one of the following: rs485, rs232c, or UDP.

8. The method of claim 7, the communication component comprising a channel module, a pulse module, and a dispatcher thread.

9. The method of claim 8, the communication component further comprising: a command module.

10. The method of claim 7, wherein the master device further comprises a master pulse thread.

11. The method of claim 10, the master device further comprising a master pulse module, a master channel module, a master custom data encoder module, and a master request handler module.

12. The method of claim 7, the set of slave devices each comprising a slave application thread, and a slave dispatcher thread.

13. The method of claim 12, the set of slave devices each further comprising a slave channel module, a slave custom data encoder module, and a slave request handler module.

14. A non-transitory computer-readable medium comprising a program for instructing a computer to perform the method of claim 7.

15. A traffic communication module for a set of slave devices, comprising:
    an application programming interface (API) component for configuring the traffic communication module;
    a communication component coupled to the API component for facilitating communications between a master device and the set of slave devices based upon a set of communication protocols, wherein the set of slave devices each comprises a slave application thread and a slave dispatcher thread; and
    a communication type component coupled to the API component for generating a set of protocol-specific data packet files for the communications.

16. The traffic communication module of claim 15, the set of slave devices each further comprising:
    a slave channel module;
    a slave custom data encoder module; and
    a slave request handler module.

17. The traffic communication module of claim 15, the set of communication protocols comprising at least one of the following: rs485, rs232c, or UDP.

18. The traffic communication module of claim 15, the communication component comprising:
    a channel module;
    a pulse module; and
    a dispatcher thread.

19. The traffic communication module of claim 18, the communication component further comprising: a command module.

* * * * *